United States Patent
Kang et al.

(10) Patent No.: US 11,961,993 B2
(45) Date of Patent: Apr. 16, 2024

(54) SECONDARY BATTERY AND APPARATUS INCLUDING THE SECONDARY BATTERY

(71) Applicant: Contemporary Amperex Technology Co., Limited, Ningde (CN)

(72) Inventors: Meng Kang, Ningde (CN); Xiaobin Dong, Ningde (CN); Jiazheng Wang, Ningde (CN); Libing He, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/056,958

(22) PCT Filed: Dec. 6, 2019

(86) PCT No.: PCT/CN2019/123729
§ 371 (c)(1),
(2) Date: Nov. 19, 2020

(87) PCT Pub. No.: WO2021/109133
PCT Pub. Date: Jun. 10, 2021

(65) Prior Publication Data
US 2021/0336244 A1 Oct. 28, 2021

(51) Int. Cl.
*H01M 4/133* (2010.01)
*H01M 4/139* (2010.01)
(Continued)

(52) U.S. Cl.
CPC ........... *H01M 4/133* (2013.01); *H01M 4/139* (2013.01); *H01M 4/364* (2013.01); *H01M 4/366* (2013.01);
(Continued)

(58) Field of Classification Search
None
See application file for complete search history.

(56) References Cited

U.S. PATENT DOCUMENTS

2017/0170465 A1* 6/2017 Kim ..................... H01M 4/366
2017/0263927 A1 9/2017 Kim et al.
(Continued)

FOREIGN PATENT DOCUMENTS

CN 105742613 A 7/2016
CN 106477569 A 3/2017
(Continued)

OTHER PUBLICATIONS

International Search Report for PCT/CN2019/123729; dated Aug. 28, 2020; 14 pages.
(Continued)

*Primary Examiner* — Zhongqing Wei
(74) *Attorney, Agent, or Firm* — East IP P.C.

(57) ABSTRACT

This application relates to a secondary battery and an apparatus including the secondary battery. Specifically, the secondary battery of this application includes a negative electrode plate, where the negative electrode plate includes a negative current collector and negative film layers where the negative film layers include a first negative film layer and a second negative film layer, the first negative film layer is disposed on at least one surface of the negative current collector and includes a first negative active material, and the second negative film layer is disposed on the first negative film layer and includes a second negative active material; the first negative active material includes natural graphite, and the second negative active material includes artificial graphite; the first negative active material satisfies $4.0 \leq COI_1 \leq 7.0$; and the second negative active material satisfies $2.2 \leq COI_2 \leq 4.2$.

16 Claims, 2 Drawing Sheets

(51) Int. Cl.
  *H01M 4/36* (2006.01)
  *H01M 4/38* (2006.01)
  *H01M 4/583* (2010.01)
  H01M 4/02 (2006.01)
  H01M 10/0525 (2010.01)
(52) U.S. Cl.
  CPC ........... *H01M 4/386* (2013.01); *H01M 4/387* (2013.01); *H01M 4/583* (2013.01); *H01M 2004/027* (2013.01); *H01M 10/0525* (2013.01); *H01M 2220/20* (2013.01)

(56) References Cited

U.S. PATENT DOCUMENTS

| 2018/0151867 A1* | 5/2018 | Lim | H01M 4/1393 |
| 2018/0190975 A1* | 7/2018 | Ishii | H01M 10/0525 |
| 2018/0287145 A1* | 10/2018 | Lee | H01M 4/133 |
| 2019/0305293 A1* | 10/2019 | Sotowa | H01M 4/587 |

FOREIGN PATENT DOCUMENTS

| CN | 108701816 A | 10/2018 |
| CN | 108878956 A | 11/2018 |
| CN | 109713298 A | 5/2019 |
| CN | 110431694 A | 11/2019 |
| JP | 2012033375 A | * | 2/2012 |
| JP | 2012033375 A | | 2/2012 |
| JP | 2013089327 A | | 5/2013 |
| KR | 20170031439 A | | 3/2017 |
| KR | 20180023820 A | | 3/2018 |
| KR | 20190004380 A | | 1/2019 |
| WO | 2012017676 A1 | | 2/2012 |
| WO | 2018225515 A1 | | 12/2018 |

OTHER PUBLICATIONS

European Search Report dated Jul. 9, 2021 for Application No. EP 19 929 189.9, 6 pages.
First Office Action for India Application No. 202117057167, dated Jul. 15, 2022, 6 pages.
The First Office Action for Japanese Application No. 2022-520068, dated Sep. 27, 2022, 6 pages.
The First Office Action for Korean Application No. 10-2022-7012041, dated Oct. 17, 2022, 14 pages.

* cited by examiner

SECONDARY BATTERY AND APPARATUS INCLUDING THE SECONDARY BATTERY

CROSS-REFERENCE TO RELATED APPLICATION

This application is a National Stage of International Application No. PCT/CN2019/123729, filed on Dec. 6, 2019, the contents of which are incorporated herein by reference in their entireties.

TECHNICAL FIELD

This application relates to the field of electrochemical technologies, and more specifically, to a secondary battery and an apparatus including the secondary battery.

BACKGROUND

New energy vehicles represent a development direction of the world's automobile industry. As a new type of high-voltage and high-energy-density power batteries, lithium-ion secondary batteries have outstanding characteristics such as light weight, high energy density, no pollution, no memory effect, and long service life, and are therefore widely applied to new energy vehicles.

As demands in the power battery market gradually grow, power batteries with higher energy densities are increasingly required. However, a prior-art technical approach used to improve energy density of batteries usually leads to deteriorated performance of the batteries in other aspects. Therefore, there is an urgent need for a new technology that can improve energy density of batteries, without degradation of or even with improvement of other electrical performance of the batteries.

SUMMARY

An objective of this application is to provide a secondary battery, where the battery has both good fast charging performance and cycle performance under the premise of relatively high energy density.

To achieve the foregoing invention objective, a first aspect of this application provides a secondary battery including a negative electrode plate, where the negative electrode plate includes a negative current collector and negative film layers, where the negative film layers include a first negative film layer and a second negative film layer, the first negative film layer is disposed on at least one surface of the negative current collector and includes a first negative active material, and the second negative film layer is disposed on the first negative film layer and includes a second negative active material;

the first negative active material includes natural graphite, and the second negative active material includes artificial graphite;

the first negative active material satisfies $4.0 \leq COI_1 \leq 7.0$, preferably, $4.3 \leq COI_1 \leq 5.5$; and the second negative active material satisfies $2.2 \leq COI_2 \leq 4.2$, preferably, $2.5 \leq COI_2 \leq 3.6$, where $COI_1$ is a ratio of peak area of 004 characteristic diffraction peak to peak area of 110 characteristic diffraction peak in an X-ray diffraction pattern of the first negative active material; and $COI_2$ is a ratio of peak area of a 004 characteristic diffraction peak to peak area of 110 characteristic diffraction peak in an X-ray diffraction pattern of the second negative active material.

A second aspect of this application provides an apparatus including the secondary battery in the first aspect of this application.

This application provides at least the following beneficial effects:

The negative electrode plate of the secondary battery in this application includes a multilayer structure, and each layer includes a specific negative active material and a specific COI range. Under a joint effect thereof, the battery can have both good fast charging performance and cycle performance under the premise of relatively high energy density. The apparatus of this application includes the secondary battery, and therefore provides at least the same advantages as the secondary battery.

Figure 1:
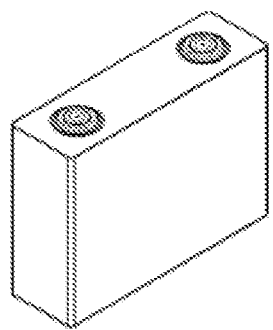
FIG. 1 is a schematic diagram of an embodiment of a secondary battery of this application.

Reference numerals in the accompanying drawings are described as follows:
1. battery pack;
2. upper cabinet body;
3. lower cabinet body;
4. battery module; and
5. secondary battery.

DETAILED DESCRIPTION

The following further describes this application with reference to specific embodiments. It should be understood that these specific embodiments are merely intended to illustrate this application but not to limit the scope of this application.

For brevity, this specification specifically discloses only some numerical ranges. However, any lower limit may be combined with any upper limit to form an unspecified range, any lower limit may be combined with another lower limit to form an unspecified range, and likewise, any upper limit may be combined with any other upper limit to form an unspecified range. In addition, each individually disclosed point or single numerical value, as a lower limit or an upper limit, may be combined with any other point or single numerical value or combined with another lower limit or upper limit to form an unspecified range.

In descriptions of this specification, it should be noted that, unless otherwise specified, "not more than" or "not less than" is inclusive of the present number, and "more" in "one or more" means two or more than two.

Unless otherwise specified, terms used in this application have well-known meanings generally understood by a person skilled in the art. Unless otherwise specified, numerical values of parameters mentioned in this application may be measured by using various measurement methods commonly used in the art (for example, testing may be performed according to a method provided in Examples of this application).

In a secondary battery, in order to increase energy density of a battery, a usual practice is increasing thickness of a film layer of an electrode plate. However, the increase in the thickness has an impact on both cycle performance and fast charging performance of the battery. This is because negative active material swells during cycling, resulting in a decrease in binding force between an active substance and a substrate, and even film stripping. This phenomenon is more serious when the thickness is increased. In addition, the increase in the thickness causes a lengthened diffusion path of active ions, affecting the fast charging performance of the battery. Therefore, how to make the battery have both good cycle performance and fast charging performance under the premise of a relatively high energy density is a huge technical challenge.

The inventors have found through a large quantity of experiments that the technical objective of this application can be achieved by adjusting composition and structure of a negative electrode plate. Specifically, a negative electrode plate of this application includes a negative current collector and negative film layers. The negative film layers include a first negative film layer and a second negative film layer. The first negative film layer is disposed on at least one surface of the negative current collector and includes a first negative active material. The second negative film layer is disposed on the first negative film layer and includes a second negative active material. The first negative active material includes natural graphite, and the second negative active material includes artificial graphite. A powder orientation index (OI) value $COI_1$ of the first negative active material satisfies $4.0 \leq COI_1 \leq 7.0$, and a powder OI value $COI_2$ of the second negative active material satisfies $2.2 \leq COI_2 \leq 4.2$, where $COI_1$ is a ratio of peak area of 004 characteristic diffraction peak to peak area of 110 characteristic diffraction peak in an X-ray diffraction pattern of the first negative active material, and $COI_2$ is a ratio of peak area of 004 characteristic diffraction peak to peak area of 110 characteristic diffraction peak in an X-ray diffraction pattern of the second negative active material. The battery can have both good cycle performance and fast charging performance under the premise of relatively high energy density.

The inventors have found through research that when the negative electrode plate meets the foregoing design requirements ($4.0 \leq COI_1 \leq 7.0$, and $2.2 \leq COI_2 \leq 4.2$), on the one hand, binding force between the negative film layer and the current collector is effectively improved, and a film stripping phenomenon of the electrode plate is relieved, thereby improving cycle performance of the battery; on another hand, the OI values of the active materials of the upper and lower film layers are controlled within the given ranges, thereby maintaining rich pore-channel structures for the negative active material of the second negative film layer during roll-pressing, to ensure that active ions can quickly migrate to the negative film layer, and facilitating pressure transfer from the second negative film layer to the first negative film layer during roll-pressing of the first negative film layer, to ensure that the first negative film layer has a relatively packing density. Pore-channel structures of the upper and lower layers are distributed more properly, thereby effectively improving dynamic performance of the battery. Even when a coating thickness is increased, a liquid diffusion rate of active ions can be ensured, thereby effectively improving the fast charging performance of the battery. The inventors have found that when the powder OI values of the active materials of the upper and lower layers are within the given ranges, the negative active material in the second negative film layer can provide more inlets for lithium intercalation to ensure that active ions can be quickly intercalated into negative active substance, and the negative active material in the first negative film layer can provide more positions for lithium intercalation to ensure that more active ions can be intercalated. The inlets and the positions for lithium intercalation at the upper and lower layers are distributed more properly, ensuring high energy density design with low charge exchange impedance and high solid diffusion rate of active ions. This effectively improves the fast charging performance of the battery. In some preferred embodiments, the first negative active material satisfies $4.3 \leq COI_1 \leq 5.5$. In some preferred embodiments, the second negative active material satisfies $2.5 \leq COI_2 \leq 3.6$.

A person skilled in the art understands that a powder OI value of a negative active material is used to indicate an orientation index of the active material, that is, a degree of anisotropy of crystal grain arrangement in a negative film layer.

In this application, COI is defined as an area ratio of (004) characteristic diffraction peak to (110) characteristic diffraction peak in an X-ray diffraction pattern of a material. That is, $COI = C_{004}/C_{110}$, where $C_{004}$ is peak area of the 004 characteristic diffraction peak, and $C_{110}$ is peak area of the 110 characteristic diffraction peak. More specifically, $COI_1$ is a ratio of peak area of 004 characteristic diffraction peak to peak area of 110 characteristic diffraction peak in an X-ray diffraction pattern of the first negative active material, and $COI_2$ is a ratio of peak area of 004 characteristic diffraction peak to peak area of 110 characteristic diffraction peak in an X-ray diffraction pattern of the second negative active material.

A powder OI value of the natural graphite may also be characterized by a ratio of peak area of (003) characteristic diffraction peak to peak area of (110) characteristic diffraction peak in an X-ray diffraction pattern of the natural graphite. That is, the powder OI value of the natural graphite = $C_{003}/C_{110}$, where $C_{003}$ is the peak area of the 003 characteristic diffraction peak, and $C_{110}$ is the peak area of the 110 characteristic diffraction peak. In this case, $C_{003}/C_{110}$ of the natural graphite in this application needs to satisfy $4.0 \leq C_{003}/C_{110} \leq 7.0$.

The powder OI values of the negative active materials may be measured by using well-known methods in the art, for example, by using a method described in the embodiments in this specification.

In some embodiments, the fast charging performance and capacity of the battery can be further improved when a ratio of the powder OI value $COI_1$ of the active material in the first negative film layer to the powder OI value $COI_2$ of the active material in the second negative film layer satisfies $1.1 \leq COI_1/COI_2 \leq 2.5$, preferably, $1.3 \leq COI_1/COI_2 \leq 1.6$. This is because when the powder OI value of the active material in the first negative film layer and the powder OI of the active material in the second negative film layer are within the given ranges, pore-channel distribution in the upper and lower film layers better matches distribution of active ions during charging, thus better facilitating design of battery cells with high-capacity and fast-charging.

The negative electrode plate as described in this application includes a current collector and two or more film layers provided on at least one surface of the current collector. The negative electrode plate may be coated on both sides (that is, film layers are provided on both surfaces of the current collector) or may be coated only on one side (that is, film layers are provided only on one surface of the current collector). The negative electrode plate of this application may be prepared by using various methods commonly used in the art. Usually, the negative current collector may be prepared first; then negative active material slurries may be prepared, and the negative active material slurries may be applied to one or both surfaces of the negative current collector; and finally, post-processing steps such as drying, welding conductive members (electrode lugs), and cutting are performed to obtain the required negative electrode plate.

Regarding the negative film layer as described in this application, a first active material slurry and a second active material slurry may be applied to the negative current collector at one time, or may be applied separately at two times. Preferably, the first active material slurry and the second active material slurry are applied to the negative current collector at one time.

The negative film layer usually includes a negative active material, an optional binder, an optional conductive agent, and other optional additives. Film layer slurriesT are usually formed by dispersing the negative active material, the optional conductive agent and binder, and the like in a solvent and stirring them evenly. The solvent may be, for example, N-methylpyrrolidone (NMP) or deionized water. Other optional additives may be, for example, a thickening and dispersing agent (such as carboxymethyl cellulose CMC) and a PTC thermistor material.

For example, the conductive agent may be one or more of graphite, superconducting carbon, acetylene black, carbon black, Ketjen black, carbon dots, carbon nanotubes, graphene, and carbon nanofibers.

For example, the binder may be one or more styrene-butadiene rubber (SBR), water-based acrylic resin, polyvinylidene fluoride (PVDF), polytetrafluoroethylene (PTFE), ethylene vinyl acetate copolymer (EVA), polyvinyl alcohol (PVA), and polyvinyl butyral (PVB).

In the negative electrode plate as described in this application, the negative active material may further include one or more of soft carbon, hard carbon, a silicon-based material, and a tin-based material. In some embodiments, the first negative active material may further include one or more of artificial graphite, soft carbon, hard carbon, a silicon-based material, and a tin-based material. In some embodiments, the second negative active material may further include one or more of natural graphite, soft carbon, hard carbon, a silicon-based material, and a tin-based material.

To further optimize battery performance, other parameters of the negative active material and electrode plate may be further controlled and adjusted. For example, degree of graphitization and particle diameter of the first negative active material and the second negative active material may be controlled within a specific range, and/or electrode plate CW, PD, electrode plate thickness, and active specific surface area may be controlled within a specific range, to further optimize an energy density, low-temperature power, and fast charging performance of battery cells.

Preferably, the natural graphite in the first negative active material is of a spherical shape or a quasi-spherical shape.

Preferably, the artificial graphite in the second negative active material is of a flake shape or a block shape.

Preferably, an average particle diameter $D_V50$ of the first active material is 9 μm-16 μm, more preferably, 11 μm-14 μm.

Preferably, an average particle diameter $D_V50$ of the second active material is 11 μm-19 μm, more preferably, 13 μm-17 μm.

Preferably, a particle diameter distribution of the first active material satisfies $0.8 \leq (D_V90-D_V10)/D_V50 \leq 1.5$, more preferably, $0.9 \leq (D_V90-D_V10)/D_V50 \leq 1.3$.

Preferably, a particle diameter distribution of the second active material satisfies $0.9 \leq (D_V90-D_V10)/D_V50 \leq 2$, more preferably, $1.1 \leq (D_V90-D_V10)/D_V50 \leq 1.6$.

In this application, $D_V10$ is the corresponding particle diameter when a cumulative volume percentage of material particles or powders reaches 10%, $D_V90$ is the corresponding particle diameter when a cumulative volume percentage of material particles or powders reaches 90%, and $D_V50$ is the corresponding particle diameter when a cumulative volume percentage of material particles or powders reaches 50%, that is, a median particle diameter of volume distribution. The unit of $D_V10$, $D_V90$, and $D_V50$ is μm.

Preferably, a degree of graphitization of the first active material is 95%-99%, more preferably, 96%-98%.

Preferably, a degree of graphitization of the second active material is 90%-95%, more preferably, 92%-94%.

Preferably, a specific surface area (BET) of the first active material is 1.6 m²/g-4.0 m²/g, more preferably, 2.1 m²/g-2.7 m²/g.

Preferably, a specific surface area (BET) of the second active material is 0.6 m²/g-2.2 m²/g, more preferably, 0.7 m²/g-1.3 m²/g.

Preferably, a tap density of the first active material is 0.8 g/cm³-1.3 g/cm³, more preferably, 0.9 g/cm³-1.2 g/cm³.

Preferably, a tap density of the second active material is 0.7 g/cm³-1.4 g/cm³, more preferably, 0.8 g/cm³-1.2 g/cm³.

Preferably, a powder compacted density of the first active material under a force of 30,000 N is 1.7 g/cm³-2.0 g/cm³, more preferably, 1.8 g/cm³-1.9 g/cm³.

Preferably, a powder compacted density of the second active material under a force of 30,000 N is 1.65 g/cm³-1.85 g/cm³, more preferably, 1.71 g/cm³-1.80 g/cm³.

Preferably, a surface of the first negative active material and/or the second negative active material is coated with a coating layer. More preferably, surfaces of the first negative active material and the second negative active material both are coated with a coating layer.

Further, binding force between the negative film layer and the current collector satisfies 6 N/m≤F≤30 N/m, preferably, 10 N/m≤F≤20 N/m.

In some preferred embodiments, a mass percentage of the natural graphite in the first negative active material is ≥60%, more preferably, ≥80%.

In some preferred embodiments, a mass percentage of the artificial graphite in the second negative active material is ≥70%, more preferably, ≥90%.

In some preferred embodiments, a mass ratio of the first negative film layer to the second negative film layer is 1:3-9:5, more preferably, 1:2-3:2.

In the secondary battery of this application, the negative film layer may be provided on one surface of the negative current collector, or may be provided on both surfaces of the negative current collector. It should be noted that the parameters of negative film layer that are given in this application all refer to parameter ranges of a film layer on a single surface. When negative film layers in a battery are provided on both surfaces of the negative current collector and if parameters of a film layer on any surface satisfy the ranges in this application, such battery falls within the protection scope of this application. In addition, ranges of a film layer thickness, a compacted density, a surface density, and the like as described in this application refer to parameters of a cold-pressed electrode plate/film layer used for assembling into a battery.

For the negative electrode plate as described in this application, the negative current collector may be a conventional metal foil or a composite current collector. A material of the metal foil may be one or more of copper, copper alloy, nickel, nickel alloy, titanium, titanium alloy, silver, and silver alloy. For example, a copper foil with a thickness of 5-30 μm may be used. The composite current collector is usually formed by synthesizing a metal material (copper, copper alloy, nickel, nickel alloy, titanium, titanium alloy, silver, silver alloy, or the like) on a polymer substrate.

In addition to the film layer, the negative electrode plate as described in this application may further comprise other additional functional layers. For example, in some preferred embodiments, the negative electrode plate as described in this application further includes a conductive primer layer (for example, consisting of a conductive agent and a binder) sandwiched between the current collector and the first film layer and provided on a surface of the current collector). In some other embodiments, the negative electrode plate as described in this application further includes a protective covering layer that covers a surface of the second film layer.

Except for the use of the negative electrode plate as described in this application, a construction and preparation method of the secondary battery as described in this application is well-known. For example, typically, the secondary battery mainly includes a negative electrode plate (that is, the negative electrode plate as described in this application), a positive electrode plate, a separator, and an electrolyte. Active ions move between positive and negative electrodes by using the electrolyte as a medium, to implement charging and discharging of the battery. To avoid a short circuit between the positive and negative electrodes through the electrolyte, the positive and negative electrodes need to be separated by the separator.

In the secondary battery of this application, the positive electrode plate includes a positive current collector and a positive active material layer that is provided on a surface of the positive current collector and that includes a positive active material. The positive active material may be transition metal composite oxides, including lithium iron phosphorus oxide, lithium iron manganese phosphorus oxide, lithium cobalt oxide, lithium nickel oxide, lithium manganese oxide, lithium nickel manganese oxide, lithium nickel cobalt manganese oxide, lithium nickel cobalt aluminum oxide, a compound obtained by adding other transition metal or non-transition metal to these lithium transition metal oxides, or a mixture of two or more of the foregoing substances. However, this application is not limited to these materials, and other well-known conventional materials that can be used as positive active materials for secondary batteries may also be used. One type of these positive active materials may be used alone, or two or more types may be used in combination.

In the secondary battery of this application, specific types and compositions of the separator and the electrolyte are not specifically limited, and may be selected according to actual needs.

Specifically, the separator may be selected, for example, from a polyethylene film, a polypropylene film, a polyvinylidene fluoride film, non-woven fabrics, and a multilayer composite film thereof.

Specifically, the electrolyte usually includes an organic solvent and an electrolyte salt. The organic solvent may be selected from chain carbonates (for examples, dimethyl carbonate DMC, diethyl carbonate DEC, ethyl methyl carbonate EMC, methyl propyl carbonate MPC, dipropyl carbonate DPC), cyclic carbonates (for example, ethylene carbonate EC, propylene carbonate PC, vinylene carbonate), other chain carboxylic acids (for example, methyl propionate), other cyclic esters (for example, γ-butyrolactone), chain ethers (for example, dimethoxyethane, diethyl ether, diethylene glycol dimethyl ether, triethylene glycol dimethyl ether), cyclic ethers (for example, tetrahydrofuran, 2-methyltetrahydrofuran), nitriles (for example, acetonitrile, propionitrile), or a mixed solvent thereof. For example, the electrolyte salt is an inorganic lithium salt such as $LiClO_4$, $LiPF_6$, $LiBF_4$, $LiAsF_6$, or $LiSbF_6$; or an organic lithium salt such as $LiCF_3SO_3$, $LiCF_3CO_2$, $Li_2C_2F_4(SO_3)_2$, $LiN(CF_3SO_2)_2$, $LiC(CF_3SO_2)_3$, or $LiCnF_{2n+1}SO_3$ ($n\geq 2$).

The following briefly describes the construction and preparation method of the secondary battery of this application.

First, the positive electrode plate of the battery may be prepared according to a conventional method in the art. This application does not limit a positive active material used for the positive electrode plate. Usually, a conductive agent (for example, a carbon material such as carbon black), a binder (for example, PVDF), and the like need to be added to the foregoing positive active material. If necessary, other additives may also be added, for example, a PTC thermistor material. Usually, a positive electrode plate is obtained by mixing and dispersing these materials in a solvent (for example, NMP), evenly stirring them, uniformly applying them onto a positive current collector, and drying the positive current collector. A metal foil such as an aluminum foil or a porous metal plate may be used as the positive current collector. An aluminum foil with a thickness of 8-30 μm is commonly used. Usually, during preparation of the positive electrode plate, no positive coating is formed on a part of the current collector, leaving the part of the current collector as a positive lead part. Apparently, a lead part may also be added later.

Then, the negative electrode plate in this application may be prepared (as a negative electrode plate) as described above.

Finally, the positive electrode plate, a separator, and the negative electrode plate may be stacked in order, so that the separator is placed between the positive and negative electrode plates as a means of separation, followed by winding (or lamination) to obtain a bare battery core; and the bare battery core is placed in an outer package, dried. After injection of the electrolyte, a procedure including vacuum packaging, standing, forming, and shaping and the like to obtain the secondary battery.

In an example, the secondary battery may include an outer package and a battery core and an electrolyte that are packaged in the outer package. There may be one or more battery cores in the secondary battery, according to needs.

In some embodiments, the outer package of the secondary battery may be a soft package (for example, a bag, whose material may be plastic, such as one or more of polypropylene PP, polybutylene terephthalate PBT, polybutylene succinate PBS), or may be a hard shell (for example, an aluminum shell).

Shape of the secondary battery in this application is not particularly limited, and may be a cylindrical shape, a square shape, or any other shapes. FIG. 1 shows a secondary battery 5 of a square structure as an example.

In some embodiments, secondary batteries may be assembled into a battery module, and the battery module may include a plurality of secondary batteries. A specific quantity may be adjusted based on application and capacity of the battery module.

Figure 2:
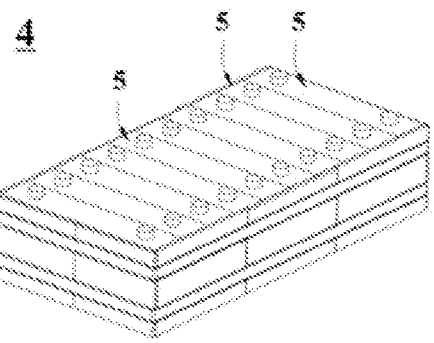
FIG. 2 is a schematic diagram of an embodiment of a battery module.

FIG. 2 shows a battery module 4 as an example. Referring to FIG. 2, in the battery module 4, a plurality of secondary batteries 5 may be sequentially arranged along a length direction of the battery module 4. Apparently, may be arranged in any other manner. Further, the plurality of secondary batteries 5 may be fixed by using fasteners.

Optionally, the battery module 4 may further include a housing with an accommodating space, and the plurality of secondary batteries 5 are accommodated in the accommodating space.

In some embodiments, battery modules may be further assembled into a battery pack, and the quantity of battery modules included in the battery pack may be adjusted based on application and capacity of the battery pack.

Figure 3:
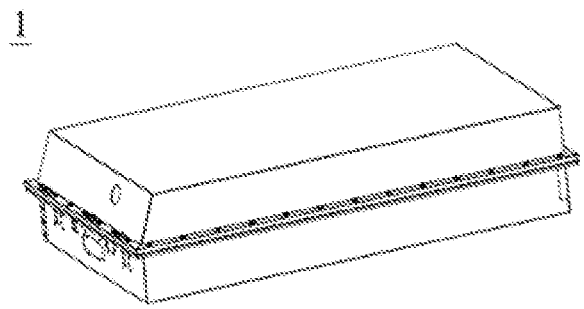
FIG. 3 is a schematic diagram of an embodiment of a battery pack.
Figure 4:
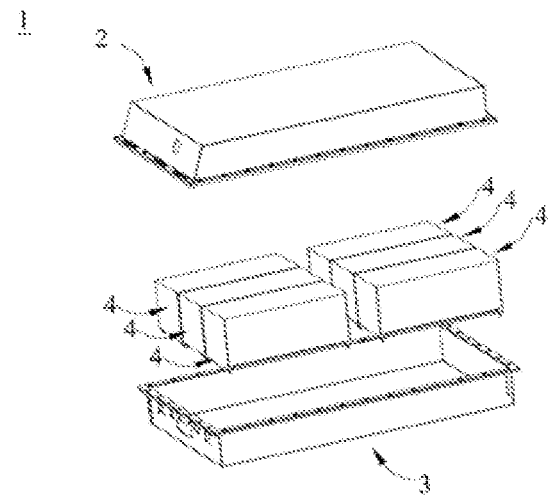
FIG. 4 is an exploded diagram of FIG. 3.

FIG. 3 and FIG. 4 show a battery pack 1 as an example. Referring to FIG. 3 and FIG. 4, the battery pack 1 may include a battery cabinet and a plurality of battery modules 4 disposed in the battery cabinet. The battery cabinet includes an upper cabinet body 2 and a lower cabinet body 3. The upper cabinet body 2 can cover the lower cabinet body 3 and form an enclosed space for accommodating the battery modules 4. The plurality of battery modules 4 may be arranged in the battery cabinet in any manner.

A second aspect of this application provides an apparatus. The apparatus includes the secondary battery in the first aspect of this application, and the secondary battery supplies power to the apparatus. The apparatus may be, but not limited to, a mobile device (for example, a mobile phone or a notebook computer), an electric vehicle (for example, a full electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A secondary battery, a battery module, or a battery pack may be selected for the apparatus according to requirements for using the apparatus.

Figure 5:
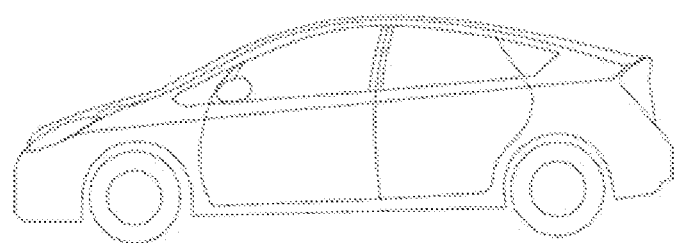
FIG. 5 is a schematic diagram of an embodiment of an apparatus using the secondary battery of this application as a power source.

FIG. 5 shows an apparatus as an example. The apparatus is a full electric vehicle, a hybrid electric vehicle, a plug-in hybrid electric vehicle, or the like. To meet a requirement of the apparatus for high power and a high energy density of a secondary battery, a battery pack or a battery module may be used.

In another example, the apparatus may be a mobile phone, a tablet computer, a notebook computer, or the like. The apparatus usually requires lightness and thinness, and a secondary battery may be used as a power source.

Beneficial effects of this application are further described below with reference to embodiments.

EXAMPLES

To make the invention objectives, technical solutions, and beneficial technical effects of this application clearer, this application is further described below in detail with reference to embodiments. However, it should be understood that the embodiments of this application are merely intended to explain this application, but not to limit this application, and the embodiments of this application are not limited to the embodiments given in this specification. In embodiments in which specific experimental conditions or operating conditions are not specified, preparation is performed according to conventional conditions or according to conditions recommended by a material supplier.

I. Preparation of a Battery

Example 1

1. Preparation of a positive electrode plate, including the following steps of:

Fully stirring and evenly mixing a lithium-nickel-cobalt-manganese ternary active substance $LiNi_{0.5}Co_{0.2}Mn_{0.3}O_2$ (NCM523), conductive carbon black Super-P, and a binder polyvinylidene fluoride (PVDF) at a weight ratio of 94:3:3 in an N-methylpyrrolidone solvent, to obtain a slurry; applying the slurry onto an aluminum foil substrate, and drying, cold-pressing, striping, and cutting to obtain a positive electrode plate.

2. Preparation of a negative electrode plate, including the following steps of:

Step 1. Preparation of a negative slurry 1: Weighing a first negative active material natural graphite, a binder SBR, a thickening agent CMC, and conductive carbon black at a weight ratio of 96.2:1.8:1.2:0.8, adding them and deionized water into a mixing tank, and mixing them to obtain a first negative slurry; The natural graphite had a powder OI value $COI_1$ of 4.5, $D_v50$ of 12.5, a degree of graphitization of 96.5%, and $(D_v90-D_v10)/D_v50$ of 0.95.

Step 2. Preparation of a negative slurry 2: Weighing a second negative active material artificial graphite, a binder SBR, a thickening agent CMC-Na, and conductive carbon black at a weight ratio of 96.2:1.8:1.2:0.8, adding them and deionized water into a mixing tankr, and mixing them to obtain a second negative slurry; The artificial graphite had a powder OI value $COI_2$ of 2.9, $D_v50$ of 15.0, a degree of graphitization of 91.8%, and $(D_v90-D_v10)/D_v50$ of 1.22.

Step 3. Simultaneously extruding the negative slurry 1 and the negative slurry 2 by using a double-chamber coating device. Applying the negative slurry 1 onto both surfaces of a current collector to form a first negative film layer, and applying the negative slurry 2 onto the first negative film layer to form a second negative film layer. Mass ratio of the first negative film layer to the second negative film layer was 1:1.

Step 4. Baking the coated wet films in an oven in different temperature zones to obtain a dry electrode plate, and cold-pressing to obtain required negative film layers, and then striping and cutting to obtain a negative electrode plate.

3. Separator

PE film was used as a separator.

4. Preparation of an electrolyte, including the following steps of:

Mixing ethylene carbonate (EC), ethyl methyl carbonate (EMC), and diethyl carbonate (DEC) at a volume ratio of 1:1:1, and then dissolving a fully dried lithium salt $LiPF_6$ in the mixed organic solvent based on a proportion of 1 mol/L, to obtain an electrolyte.

5. Preparation of a battery, including the following steps of:

Stacking the positive electrode plate, the separator, and the negative electrode plate in order, and winding to obtain a battery core. Placing the battery core in an outer package, adding the electrolyte, and perform a procedure including packaging, standing, forming, and aging to obtain a secondary battery.

Preparation methods of Examples 2 to 18 and Comparative Examples 1 to 4 were similar to that of Example 1, but composition and product parameters of the negative electrode plate were varied. For details about different product parameters, see Tables 1 to 3.

II. Performance Parameter Test Method

1. Parameter Tests for a Negative Active Material and Negative Film Layer

(1) OI Test

A powder OI of the negative active material may be obtained by using an X-ray powder diffractometer (X'pert PRO). An X-ray diffraction pattern is obtained according to general rules for an X-ray diffraction analysis method and a graphite lattice parameter determination method in JIS K 0131-1996 and JB/T4220-2011 respectively. $COI=C_{004}/C_{110}$, where $C_{004}$ is a peak area of a 004 characteristic diffraction peak, and $C_{110}$ is a peak area of a 110 characteristic diffraction peak.

Specifically, a method for testing the powder OI of the negative active material is as follows: placing a specific amount of negative active material powders in the X-ray powder diffractometer, obtaining the peak area of the 004 crystal plane diffraction peak and the peak area of the 110 crystal plane diffraction peak by using the X-ray diffraction analysis method, and further obtaining the COI of the negative active material.

(2) Particle Diameter of the Negative Active Material

Regarding the particle diameter $D_v50$ of the negative active material, particle diameter distribution may be measured by using a laser diffraction particle diameter distribution measuring instrument (Mastersizer 3000) and according to a laser diffraction particle diameter distribution method (for details, refer to GB/T 19077-2016), and a median value $D_v50$ of volume distribution is used to represent average particle diameter.

(3) Surface Density of the Negative Film Layer

The surface density of the negative film layer=m/s, where m represents weight of the film layer, and s represents area of the film layer. m may be obtained through weighing by using an electronic balance with an accuracy of 0.01 g or more accurate.

(4) Compacted Density of the Negative Film Layer

The compacted density of the negative film layer=m/V, where m represents the weight of the film layer, and V represents volume of the film layer. m may be obtained through weighing by using an electronic balance with a resolution of 0.01 g or more accurate. A product of surface area of the film layer and thickness of the film layer is the volume V of the film layer. The thickness of the film layer may be measured by using a spiral micrometer with a resolution of 0.5 μm.

2. Battery Performance Test

(1) Fast Charging Performance Test

At a normal temperature, charge and discharge a prepared lithium-ion battery (including three electrodes) for the first time with a current of 1 C (that is, a current value at which a theoretical capacity is completely discharged within 1 h), where the charging is constant-current and constant-voltage charging, an end voltage is 4.2 V, a cut-off current is 0.05 C, and an end-of-discharge voltage is 2.8 V; and record a theoretical capacity of the battery as C0. Then charge the battery to an all-electric cut-off voltage 4.2 V or a 0 V negative cut-off potential sequentially with constant currents of 0.5 C0, 1 C0, 1.5 C0, 2 C0, 2.5 C0, 3 C0, 3.5 C0, 4 C0, and 4.5 C0. After the completion of each charging, the battery needs to be discharged to 2.8 V at 1 C0. Record corresponding anode potentials when the battery is charged to 10%, 20%, 30%, . . . , and 80% SOC states at different charging rates, draw rate-anode potential curves under different SOC states, and perform linear fitting to obtain corresponding charging rates under different SOC states when an anode potential is 0 V, where such charging rates are charging windows under the SOC states, and are denoted as $C_{10\%\ SOC}$, $C_{20\%\ SOC}$, $C_{30\%\ SOC}$, $C_{40\%\ SOC}$, $C_{50\%\ SOC}$, $C_{60\%\ SOC}$, $C_{70\%\ SOC}$, and $C_{80\%\ SOC}$. Calculate. Based on a formula $(60/C_{20\%\ SOC}+60/C_{30\%\ SOC}+60/C_{40\%\ SOC}+60/C_{50\%\ SOC}+60/C_{60\%\ SOC}+60/C_{70\%\ SOC}+60/C_{80\%\ SOC})\times 10\%$, a charging time T for charging the battery from 10% SOC to 80% SOC is obtained. A shorter time indicates better fast charging performance of the battery.

(2) Cycle Performance Test

At a normal temperature, charge and discharge a prepared lithium-ion battery cell for the first time with a current of 1 C (that is, a current value at which theoretical capacity is completely discharged within 1 h), where the charging is constant-current and constant-voltage charging, an end voltage is 4.2 V, a cut-off current is 0.05 C, and an end-of-discharge voltage is 2.8 V; and record a discharge capacity Cb in first cycle of the battery cell. Then perform a cycle life test at a normal temperature. Perform 1 C/1 C cycle, and record a discharge capacity Ce of the battery cell at any time, where a ratio of Ce to Cb is a capacity retention rate after cycle. Stop the test when the capacity retention rate is less than or equal to 80%, and record the quantity of cycles.

(3) Binding Force Test

Obtain a coated and cold-pressed negative electrode plate, and cut it into a test sample with a length of 100 mm and a width of 10 mm. Obtain a stainless steel plate with a width of 25 mm, attach a double-faced adhesive tape (with a width of 11 mm), attach the test sample to the double-faced adhesive tape on the stainless steel plate, and roll a 2000 g compression roller back and forth on a surface of the test sample three times (300 mm/min). Bend the test sample by 180 degrees, manually separate a negative membrane and a current collector of the test sample by 25 mm through peeling, and fix the test sample on a testing machine, so that a peeling surface is consistent with a force line of the testing machine. Perform continuous peeling at 300 mm/min by using the testing machine, to obtain a peeling force curve. Use an average value of a stable segment as a peeling force F0. In this case, binding force F between the negative membrane and the current collector of the test sample=F0/the width of the test sample (a measurement unit of F is N/m).

III. Test Results of Examples and Comparative Examples

Batteries of Examples and Comparative Examples were prepared according to the foregoing method, and performance parameters were measured. Results were shown in the following tables.

TABLE 1

| | First active material | OI of the first active material, $COI_1$ | Average particle diameter $D_v50$ of the first active material (μm) | Second active material | OI of the second active material, $COI_2$ | Average particle diameter $D_v50$ of the second active material (μm) | $COI_1/COI_2$ | Binding force between negative film layer and current collector (N/m) | Fast charging performance (minute) | Cycle performance (quantity of cycles) |
|---|---|---|---|---|---|---|---|---|---|---|
| Examples 1 | Natural graphite | 4.0 | 13.7 | Artificial graphite | 3 | 15.1 | 1.33 | 9 | 20.5 | 1664 |
| Example 2 | Natural graphite | 4.3 | 13.0 | Artificial graphite | 3 | 15.1 | 1.43 | 12 | 18.8 | 1805 |
| Example 3 | Natural graphite | 5.0 | 12.5 | Artificial graphite | 3 | 15.1 | 1.67 | 15 | 15.1 | 2120 |
| Example 4 | Natural graphite | 5.5 | 12.5 | Artificial graphite | 3 | 15.1 | 1.83 | 20 | 19.2 | 1830 |
| Example 5 | Natural graphite | 7.0 | 12.5 | Artificial graphite | 3 | 15.1 | 2.33 | 25 | 20.7 | 1501 |
| Comparative Example 1 | Natural graphite | 3.8 | 14.2 | Artificial graphite | 3 | 15.1 | 1.27 | 5 | 25.6 | 635 |
| Comparative Example 2 | Natural graphite | 7.2 | 12.5 | Artificial graphite | 3 | 15.1 | 2.40 | 35 | 24.3 | 760 |

TABLE 2

| | First active material | OI of the first active material, $COI_1$ | Average particle diameter $D_v50$ of the first active material (μm) | Second active material | OI of the second active material, $COI_2$ | Average particle diameter $D_v50$ of the second active material (μm) | $COI_1/COI_2$ | Binding force between negative film layer and current collector (N/m) | Fast charging performance (minute) | Cycle performance (quantity of cycles) |
|---|---|---|---|---|---|---|---|---|---|---|
| Example 6 | Natural graphite | 5 | 12.5 | Artificial graphite | 2.2 | 15.8 | 2.27 | 15.5 | 19.7 | 1784 |
| Example 7 | Natural graphite | 5 | 12.5 | Artificial graphite | 2.5 | 15.5 | 2.00 | 15.3 | 17.4 | 1843 |
| Example 8 | Natural graphite | 5 | 12.5 | Artificial graphite | 3 | 15.1 | 1.67 | 15.0 | 15.1 | 2120 |
| Example 9 | Natural graphite | 5 | 12.5 | Artificial graphite | 3.6 | 15.1 | 1.39 | 14.8 | 19.5 | 1790 |
| Example 10 | Natural graphite | 5 | 12.5 | Artificial graphite | 4.2 | 15.1 | 1.19 | 14.1 | 21.6 | 1295 |
| Comparative Example 3 | Natural graphite | 5 | 12.5 | Artificial graphite | 2 | 16.3 | 2.50 | 15.1 | 24.7 | 707 |
| Comparative Example 4 | Natural graphite | 5 | 12.5 | Artificial graphite | 4.5 | 15.1 | 1.11 | 14.5 | 26.5 | 434 |

TABLE 3

| | First active material | OI of the first active material, $COI_1$ | Average particle diameter $D_v50$ of the first active material (μm) | Second active material | OI of the second active material, $COI_2$ | Average particle diameter $D_v50$ of the second active material (μm) | $COI_1/COI_2$ | Binding force between negative film layer and current collector (N/m) | Fast charging performance (minute) | Cycle performance (quantity of cycles) |
|---|---|---|---|---|---|---|---|---|---|---|
| Example 11 | Natural graphite | 6.5 | 12.5 | Artificial graphite | 2.4 | 15.7 | 2.71 | 24.3 | 20.1 | 1714 |
| Example 12 | Natural graphite | 6.1 | 12.5 | Artificial graphite | 2.5 | 15.5 | 2.44 | 23.1 | 19.1 | 1820 |
| Example 13 | Natural graphite | 5.0 | 12.5 | Artificial graphite | 2.8 | 15.1 | 1.79 | 18.6 | 14.9 | 2223 |
| Example 14 | Natural graphite | 4.9 | 12.5 | Artificial graphite | 2.9 | 15.1 | 1.69 | 18.4 | 14.6 | 2248 |
| Example 15 | Natural graphite | 4.6 | 12.5 | Artificial graphite | 3.3 | 15.1 | 1.39 | 16.0 | 17.3 | 2135 |
| Example 16 | Natural graphite | 4.5 | 12.5 | Artificial graphite | 3.4 | 15.1 | 1.32 | 13.5 | 18.9 | 1803 |
| Example 17 | Natural graphite | 4.3 | 13 | Artificial graphite | 3.8 | 15.1 | 1.13 | 10.1 | 19.2 | 1787 |
| Example 18 | Natural graphite | 4.1 | 13.5 | Artificial graphite | 3.9 | 15.1 | 1.05 | 8.6 | 21.5 | 1608 |

It can be learned from the data of Examples 1 to 5 and Comparative Examples 1 to 2 that, when natural graphite is used as the first negative active material for the first negative film layer and artificial graphite is used as the second negative active material for the second negative film layer, the powder OI values of the two negative active materials need to fall within the ranges in this application for matching, in order to achieve both good fast charging performance and good cycle performance. The $COI_1$ in Comparative Example 1 is too small, and the $COI_1$ in Comparative Example 2 is too large. In Comparative Examples 1 and 2, the battery cycle performance significantly deteriorated, and the fast charging performance was relatively poor. It can be learned from the film layer binding force data of Comparative Examples and Examples that, a larger $COI_1$ indicates stronger binding force of film layer. To ensure good fast charging performance and cycle performance, $COI_1$ should be in a range of 4.0 to 7.0, preferably, in a range of 4.3 to 5.5.

It can be learned from the data of Examples 6 to 10 and Comparative Examples 3 to 4 that, when natural graphite is used as the first negative active material for the first negative film layer and artificial graphite is used as the second negative active material for the second negative film layer, the powder OI values of the two negative active materials need to fall within the ranges in this application for matching, in order to achieve both good fast charging performance and good cycle performance. The $COI_2$ in Comparative Example 3 is too small, and the $COI_2$ in Comparative Example 2 is too large. In Comparative Examples 2 and 3, the battery cycle performance significantly deteriorated, and the fast charging performance was relatively poor. To ensure good fast charging performance and cycle performance, $COI_2$ should be in a range of 2.2 to 4.2, preferably, in a range of 2.5 to 3.6.

It can be learned from a comparison between Example 13 and Example 3, and a comparison between Example 2 and Example 14 that, within a specific range, a larger $COI_1/COI_2$ indicates better fast charging and cycle performance. However, it can be learned from all Examples and Comparative Examples that overall performance is relatively good when the $COI_1/COI_2$ value is in a range of 1.1 to 2.5, especially when $1.3 \leq COI_1/COI_2 \leq 1.6$.

It should be further noted that according to the disclosure and guidance in this specification, a person skilled in the art to which this application relates may also make appropriate changes and modifications to the foregoing embodiments. Therefore, this application is not limited to the specific embodiments disclosed and described above, and modifications and changes to this application also fall within the protection scope of the claims of this application. In addition, although some specific terms are used in this specification, these terms are merely intended for ease of description, and do not constitute any limitation on this application.

What is claimed is:

1. A secondary battery, comprising a negative electrode plate, a positive electrode plate, a separator, and an electrolyte, wherein the electrolyte comprises an organic solvent and an electrolyte salt, the negative electrode plate comprises a negative current collector and negative film layers, wherein the negative film layers comprise a first negative film layer and a second negative film layer, the first negative film layer is disposed on at least one surface of the negative current collector and comprises a first negative active material, and the second negative film layer is disposed on the first negative film layer and comprises a second negative active material;

the first negative active material comprises natural graphite, and the second negative active material comprises artificial graphite;

the first negative active material has a powder orientation index (OI) value $COI_1$ satisfying $4.7 \leq COI_1 \leq 5.0$; and the second negative active material has a powder orientation index (OI) value $COI_2$ satisfying $2.8 \leq COI_2 \leq 3.0$, and the first negative active material and the second negative active material further satisfy $1.1 \leq COI_1/COI_2 \leq 2.5$, wherein $COI_1$ is a ratio of peak area of 004 characteristic diffraction peak to peak area of 110 characteristic diffraction peak in an X-ray diffraction pattern of the first negative active material; and $COI_2$ is a ratio of peak area of 004 characteristic diffraction peak to peak area of 110 characteristic diffraction peak in an X-ray diffraction pattern of the second negative active material; and wherein the first negative active material has a particle diameter distribution satisfying $0.8 \leq (D_v90-D_v10)/D_v50 \leq 1.5$, and the second negative active material has a particle diameter distribution satisfying $0.9 \leq (D_v90-D_v10)/D_v50 \leq 2$.

2. The secondary battery according to claim 1, wherein the artificial graphite is of a flake shape.

3. The secondary battery according to claim 1, wherein a mass percentage of the natural graphite in the first negative active material is $\geq 60\%$; and/or a mass percentage of the artificial graphite in the second negative active material is $\geq 70\%$.

4. The secondary battery according to claim 1, wherein the first negative active material satisfies one or more of the following (1) to (5):
(1) an average particle diameter $D_v50$ of 9 μm-16 μm;
(2) a degree of graphitization of 95%-99%
(3) a specific surface area (BET) of 1.6 m$^2$/g-4.0 m$^2$/g;
(4) a tap density of 0.8 g/cm$^3$-1.3 g/cm$^3$; and
(5) a powder compacted density of 1.7 g/cm$^3$-2.0 g/cm$^3$ under a force of 30,000 N.

5. The secondary battery according to claim 1, wherein the second negative active material satisfies one or more of the following (1) to (5):
(1) an average particle diameter $D_v50$ of 11 μm-19 μm;
(2) a degree of graphitization of 90%-95%;
(3) a specific surface area (BET) of 0.6 m$^2$/g-2.2 m$^2$/g;
(4) a tap density of 0.7 g/cm$^3$-1.4 g/cm$^3$; and
(5) a powder compacted density under a force of 30,000 N is 1.65 g/cm$^3$-1.85 g/cm$^3$.

6. The secondary battery according to claim 1, wherein surfaces of particles of the first negative active material and/or particles of the second negative active material are coated with a coating layer.

7. The secondary battery according to claim 1, wherein a mass ratio of the first negative film layer to the second negative film layer is 1:3-9:5.

8. The secondary battery according to claim 1, wherein the first negative active material further comprises one or more of artificial graphite, soft carbon, hard carbon, a silicon-based material, and a tin-based material; and/or the second negative active material further comprises one or more of natural graphite, soft carbon, hard carbon, a silicon-based material, and a tin-based material.

9. An apparatus, comprising the secondary battery according to claim 1.

10. The secondary battery according to claim 1, wherein $1.3 \leq COI_1/COI_2 \leq 1.6$.

11. The secondary battery according to claim 3, wherein a mass percentage of the natural graphite in the first negative active material is 80%-100%.

12. The secondary battery according to claim 3, wherein a mass percentage of the artificial graphite in the second negative active material is 90%-100%.

13. The secondary battery according to claim 1, wherein the first negative active material satisfies one or more of the following (1) to (6):
   (1) an average particle diameter $D_v50$ of 11 μm-14 μm;
   (2) a particle diameter distribution satisfying $0.9 \leq (D_v90-D_v10)/D_v50 \leq 1.3$;
   (3) a degree of graphitization of 96%-98%;
   (4) a specific surface area (BET) of 2.1 $m^2$/g-2.7 $m^2$/g;
   (5) a tap density of 0.9 $g/cm^3$-1.2 $g/cm^3$; and
   (6) a powder compacted density of 1.8 $g/cm^3$-1.9 $g/cm^3$ under a force of 30,000 N.

14. The secondary battery according to claim 1, wherein the second negative active material satisfies one or more of the following (1) to (6):
   (1) an average particle diameter $D_v50$ of 13 μm-17 μm;
   (2) a particle diameter distribution satisfying $1.1 \leq (D_v90-D_v10)/D_v50 \leq 1.6$;
   (3) a degree of graphitization of 92%-94%;
   (4) a specific surface area (BET) of 0.7 $m^2$/g-1.3 $m^2$/g;
   (5) a tap density of 0.8 $g/cm^3$-1.2 $g/cm^3$; and
   (6) a powder compacted density under a force of 30,000 N is 1.71 $g/cm^3$-1.80 $g/cm^3$.

15. The secondary battery according to claim 1, wherein surfaces of particles of the first negative active material and of particles of the second negative active material both are coated with a coating layer.

16. The secondary battery according to claim 1, wherein a mass ratio of the first negative film layer to the second negative film layer is 1:2-3:2.

* * * * *